Aug. 2, 1927.  1,637,886

W. WEILER

SINGLE PHASE INDUCTION MOTOR CONTROL SYSTEM

Filed Oct. 16, 1926

Inventor:
Wilhelm Weiler;
by
His Attorney.

Patented Aug. 2, 1927.

1,637,886

UNITED STATES PATENT OFFICE.

WILHELM WEILER, OF NIEDERSCHONHAUSEN, BERLIN, GERMANY, ASSIGNOR TO GENERAL ELECTRIC COMPANY, A CORPORATION OF NEW YORK.

SINGLE-PHASE INDUCTION-MOTOR CONTROL SYSTEM.

Application filed October 16, 1926, Serial No. 142,087, and in Germany February 24, 1926.

My invention relates to a single phase induction machine control system in which a commutator machine is connected in cascade with the induction machine for the purpose of speed control and power factor correction. It is known that in the operation of single phase induction motors there occurs in the secondary circuit, in addition to the currents of slip frequency, superimposed currents of higher frequency. These currents of higher frequency seriously interfere with the successful operation of the commutator machine as it is ordinarily used and it is the object of my invention to overcome this difficulty.

The features of my invention which are believed to be new and patentable will be pointed out in the claims appended hereto. For a better understanding of my invention reference is made in the following description to the accompanying drawing which shows in Fig. 1 a cascade system and exciting arrangement of the character where my invention is particularly applicable; Fig. 2 shows the ordinary arrangement of the commutator machine of such a combination; and Fig. 3 shows the exciting circuits of the commutator machine modified in accordance with my invention.

Figure 1:
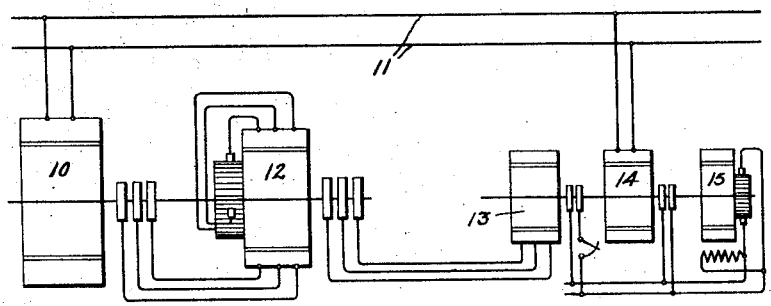
Figure 2:
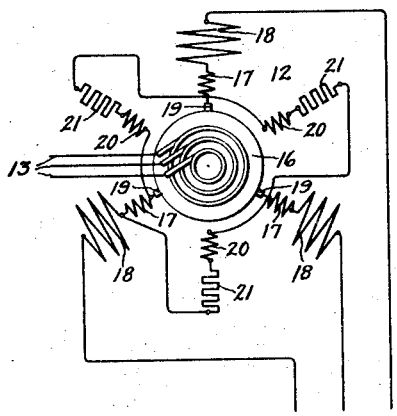

The combination shown in Fig. 1 comprises the main single phase induction motor 10 energized from the single phase source 11. The secondary of machine 10 is wound polyphase and is concatenated with a polyphase commutator machine 12, preferably mounted on the same shaft. The polyphase excitation at line frequency required for machine 12 is obtained in this instance from a polyphase exciter 13 driven by a synchronous motor 14. A direct current exciter 15 driven by motor 14 supplies the direct current excitation for the two synchronous machines 13 and 14.

The polyphase commutator machine 12 of such a combination as ordinarily used is represented in Fig. 2 and comprises the commutated rotor winding 16 supplied through slip rings from the alternating current source 13, the commutating pole field 17 and armature compensating field 18 connected in series with the commutator brushes 19 to the polyphase secondary of the induction motor 10, and the field windings 20 connected between the brushes 19 to suppress voltages resulting from the main field of the machine which would be detrimental to commutation. The representation here shown is merely diagrammatic. The field coils 20 are wound on the interpoles with coils 17 and serve to suppress voltages induced by the main motor field into the armature coils undergoing commutation. The current in coils 20 is generally reduced by the resistances represented at 21. In some cases the compensating field is omitted. In the single phase induction motor secondary there is induced the ordinary slip frequency secondary currents and a superimposed current having a frequency equal to that of the primary plus the frequency of rotation. Both currents naturally traverse the circuits of the commutator machine. It is desired that the current of higher frequency traverse the commutating field 17 because this high frequency current passes through the armature and must be commutated. However, it is undesirable to have this high frequency current or a component thereof pass through the field coils 20 because these coils are intended to suppress voltages of slip frequency and when the higher frequency currents are allowed to flow in these coils, it is detrimental to commutation.

Figure 3:
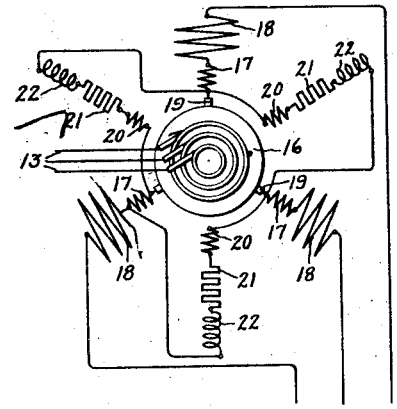

In accordance with my invention I provide choke coils 22 in series with the coils 20 as shown in Fig. 3. These choke coils allow the low frequency slip currents to pass unimpeded but effectively prevent the passage of the current of considerable higher frequency. The three choke coils 22 may be mounted on a multiple limb iron core separate from the machine, if desired.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

In combination, a source of supply, a single phase induction motor supplied thereby, said motor having a polyphase secondary winding, a polyphase commutator machine driven by said motor and connected in cascade therewith, means for supplying polyphase excitation at the frequency of said source to the rotor of said commutator machine, said commutator machine having commutating poles provided with windings connected in series between the commutator and the induction motor secondary, and a second winding on said commutating poles energized from the commutator voltage of said commutator machine, and means for suppressing the flow of high frequency currents in said second field winding while permitting the flow of current of slip frequency.

In witness whereof, I have hereunto set my hand this 22nd day of September, 1926.

WILHELM WEILER.